United States Patent [19]
Ensor et al.

[11] Patent Number: 6,111,508
[45] Date of Patent: Aug. 29, 2000

[54] WARNING DEVICE

[75] Inventors: David John Ensor, West Harbour; Grant David Law; John Bryce Stothers, both of Whakatane, all of New Zealand

[73] Assignee: Shoof International Limited, Cambridge, New Zealand

[21] Appl. No.: 09/171,444

[22] PCT Filed: Apr. 18, 1997

[86] PCT No.: PCT/NZ97/00047

§ 371 Date: Feb. 26, 1999

§ 102(e) Date: Feb. 26, 1999

[87] PCT Pub. No.: WO97/39618

PCT Pub. Date: Oct. 30, 1997

[30] Foreign Application Priority Data

Apr. 21, 1996 [NZ] New Zealand .......................... 280773
Sep. 11, 1996 [NZ] New Zealand .......................... 299359

[51] Int. Cl.$^7$ .................................................. G08B 23/00
[52] U.S. Cl. ...................................... 340/573.2; 340/573.1; 340/539; 119/51.02
[58] Field of Search .............................. 340/573.2, 573.1, 340/539, 693.1; 119/51.02, 51.15

[56] References Cited

U.S. PATENT DOCUMENTS

| | | | |
|---|---|---|---|
| 3,336,530 | 8/1967 | Sloan et al. | 340/573.1 |
| 4,461,241 | 7/1984 | Ostler | 119/51 R |
| 4,476,469 | 10/1984 | Lander | 340/825.49 |
| 4,512,096 | 4/1985 | Heidecker | 40/304 |
| 4,961,575 | 10/1990 | Perry | 340/825.36 |
| 5,134,370 | 7/1992 | Jefferts et al. | 324/247 |
| 5,711,246 | 1/1998 | Yano et al. | 119/51.02 |
| 5,917,425 | 6/1999 | Crimmins et al. | 340/573.1 |
| 5,923,255 | 7/1999 | Vahdatshoar | 340/573.4 |

*Primary Examiner*—Daniel J. Wu
*Assistant Examiner*—Anh La
*Attorney, Agent, or Firm*—Frank H. Foster; Kremblas, Foster, Millard & Pollick

[57] ABSTRACT

The invention relates to a method of Identifying an animal within a group, the method of identification being characterised by the steps of: a) attaching an identification (21) to the animal, and b) locating an activation device (23) at a location, and c) activating an indicator (25) when the identification device Is near the activation device.

42 Claims, 3 Drawing Sheets

WARNING DEVICE

TECHNICAL FIELD

This invention relates to alarm systems and devices.

BACKGROUND ART

In the dairy industry strict controls and testing procedures are used to ensure only high quality milk is used to produce dairy products. Strict testing procedures are conducted on all milk supplied to a dairy factory. Any dairy farmer supplying substandard or contaminated milk is heavily penalised in the event that the deficiencies in the milk supplied are discovered.

One way contaminated milk may be supplied into a dairy farmer's collection vat is by the milking of cows which are either sick or have been medicated to prevent or combat an illness.

A sick cow may transmit to its milk the organisms or substances which are the cause of a cow's sickness. Any milk collected from such a cow would be mixed with large quantities of uncontaminated milk. Such mixing may provide the perfect habitat or environment for a harmful microorganism to grow, ruining a large quantity of previously pure milk. The same may be true of a cow which has been medicated. The medicating substances supplied to a cow may remain in the udder or circulate through its system eventually being transmitted to the milk produced by the cow. Medications which may be beneficial to a cow can have detrimental effects on human beings, or interfere with the manufacturing processes used to produce certain dairy products.

Because of these reasons, pressure and penalties are applied to a farmer to ensure that any milk supplied is of a certain standard and purity. To this effect farmers must ensure that any animal which should not be milked is either removed from the milking shed, passes through the milking shed without being milked, or that any contaminated milk taken from such an animal is kept separate from that collected from the rest of the herd.

To ensure a cow is not milked inadvertently, several methods of identifying such cows have been developed.

Initially a contaminated cow may be marked with spray paint, or a removable tag placed on the cows leg or tail.

The disadvantages of these methods are that these markings used are not necessarily apparent to the persons milking the cow. Low light levels in the milking shed may prevent such marking devices from standing out and catching the eye of a milker. In addition, a marked contaminated cow may be covered in varying degrees with mud and excrement which may cover or obscure markings on the cow.

In contrast to the above method more recent high technology herd identification systems have been developed. These systems assign a unique identification number to each animal and mark each animal with an electro magnetic indicator such as a magnetically coded tag or radio transmitter. A monitoring system is then used to track and collect data relevant to each particular animal.

For example during each milking the monitoring system may log for each animal the amount of milk produced, quality of the milk the weight of the animal and the time taken to milk the animal. This information is then collated into a database for the entire herd, or an individual file on each animal charting the animal's growth and milk production characteristics.

This type of identification and monitoring system is extremely expensive and out of reach of most dairy farmers.

The entire system includes peripheral computer devices which manage the data logged for each animal.

Each member of the herd is required to wear an identification device, adding to the costs of these systems.

These systems are constructed from high technology components which increase the cost of the system and make maintenance a real problem for the average farmer. If any breakdown or error occurs there may be nothing a farmer can do to fix the problem.

To solve the problems mentioned above, there needs to be an alarm system with some of the following characteristics.

The alarm system would need to effectively indicate to an operator the presence of any "tagged" animal to prevent its milk being mixed in with that collected from the rest of the herd.

Such a system would need to be cheaply mass produced to place the system within reach of most dairy farmers, and allow easy replacement of any broken or faulty components.

The components of such a system need to be sturdy and water proof to allow the components to be washed down or knocked around by an animal.

The system ideally would also be self contained, possibly using batteries as a power supply and provide a highly noticeable indication of the presence of a nominated animal in the milking shed.

Such a system would also need to be simply constructed and operated to allow easy manufacture and operation of the system.

The system would need to operate within a standard proximity range, to avoid confusion over which animals had triggered the indication or alarm components.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method of identifying an animal within a group, characterised by the steps of:

a) attaching an identification device to an animal, and b) locating an activation device at a location, and c) activating an indicator when the identification device is near the activation device.

According to another aspect of the present invention there is provided apparatus for a method of identifying an animal substantially as described above wherein the identification apparatus comprises, an identification device attached to an animal, an activating device, and an indicator, characterised in that the location of the activating device near the identification device activates the indicator.

In a preferred embodiment of the present invention the identification device consists of a radio transmitter. The identification device continually emits a radio signal when supplied sufficient electrical power.

Other embodiments may not use a radio transmitter as the identification device. Other embodiments may use devices which emit different frequencies of electromagnetic energy, not necessarily in the radio frequency range. For example, other embodiments may use identification devices which emit infra-red signals, visible light signals or even audible sound signals.

In alternative embodiments of the present invention the identification device may not continually emit any form of energy signal. In some embodiments the identification device may be a passive component which is triggered by receipt of a signal from another device where such triggering may cause the identification device to emit a transmission of its own.

Alternatively, the identification device may include material or an object which provokes a reaction in other components of the identification system.

This material or object may, for example, provide a specific magnetic or electric field to which another component of the identification system is sensitive.

In a preferred embodiment of the present invention the identification device is attached to the leg of an animal by a strap. For example a strap may be attached to the identification device which is then tied, stapled, glued or fastened with VELCRO™ around the leg of an animal.

In alternative embodiments of the invention the identification device and associated strap may be attached to other parts of the animal, not necessarily the leg. For example, with dairy cows the identification device may be attached to the cows tail, neck, hoof or around the animal's chest.

In another embodiment of the present invention the identification device may be incorporated into a tag. Such a tag may be for example riveted permanently into the ear of an animal. Provision is also made in some embodiments for the removable attachment of the identification device to standard identifying ear tags used in some farming applications.

In a preferred embodiment of the present invention the activating device includes a radio receiver adapted to receive radio transmissions from the identification device. The activation device may also include associated electrical circuitry adapted to transmit an activation signal to the indicator.

In other embodiments of the present invention the activation device may not include a radio receiver or associated activation signalling circuitry. The activation device may include a receiver capable of receiving electromagnetic signals from the identification device other than in the radio spectrum. For example, the activation device may include a receiver capable of receiving infra-red signals, visible light signals or audible sound signals.

Alternatively in other embodiments of the present invention the activation device may be sensitive to a specific electrical or magnetic field emitted by the identification device In yet another embodiment of the present invention the activation device may emit a signal which the identification device is capable of receiving. On receipt of such a signal the identification device may then transmit an acknowledgment signal to the activation device, informing the activation device of its presence.

In a preferred embodiment of the present invention it is envisioned that the animal to be identified is a dairy cow and that the identification system is to be used in or around the milking shed of a farm.

Reference throughout the specification shall now be made to the invention being used to identify selected cows when the cows are in or around a milking shed. However it should be appreciated that in other embodiments of the present invention the invention may be used with different animals and in different situations.

In a preferred embodiment of the present invention the indicator is incorporated into the same physical housing as the activation device. This configuration of the indicator and activation device combined allows easy transmission of an electrical activating signal from the activation device to the indicator.

In the case where more than one activation devices are incorporated into the identification system, the inclusion of the indicator into the activation device housing eliminates any confusion as to which activation device triggered an indicator.

In an alternative embodiment of the present invention the indicator is incorporated into the housing of the identification device. In this way when the indicator is triggered there is no doubt which animal has been identified.

In yet another embodiment of the present invention the indicator may be located separate from both the identifying and activation devices. For example, the indicator may be located at the entrance to a milking shed or any other portion of the milking shed where the indicator may be clearly seen or heard by persons milking in the shed.

In a preferred embodiment of the present invention the activation device is worn on the body of a person milking the cows. The activation device may be worn as for example a necklace, wrist strap, leg band or even tucked into the pocket of a milking apron or other clothing. Locating the activation device in the preferred embodiment with the indicator ensures that the person carrying the device is easily and clearly alerted by the indicator. The indicator is always in the operators field of view and close to their ears.

A person carrying the activation device may milk cows as usual, with the activation device only activating the indicator when it comes in close proximity to a cow bearing an identification device.

In an alternative embodiment of the present invention the activation device is located at the entrance to the milking shed. A cow carrying an identification device will be identified by the activation device well before it reaches the milking stalls.

In this way an identified cow may be segregated from the remaining herd and isolated until the end of milking or her milk isolated from the bulk milk storage tank.

In another embodiment the activation device is located inside a milking stall and may identify any cows within that stall that carry the identification device.

In a preferred embodiment of the present invention the indicator indicates the identification of an animal by emitting an audible alarm siren. This alarm siren alerts a farmer to the presence of a cow which he or she wished identified. The alarm siren is loud enough to be noticed over the normal operating noises of a milking shed, to catch the attention of the person milking the cows.

In other embodiments of the present invention the indicator may include a light source which is operated when the identification system is required to indicate the presence of an identified animal. In some embodiments the light source may produce an intermittent flashing light, or may be rotated to catch the eye of any persons present.

In an alternative embodiment the indicator may include a vibrating component. When the indicator is worn close to the body of the person milking, the vibration of the indicator may be sensed by that person where in some situations audible or visual signals could be missed.

In a preferred embodiment of the present invention the indicator is triggered by an electrical signal from the activation device. Once the activation device senses the presence of the identification device it may transmit an electrical signal to the indicator triggering the indicator into producing an alarm siren for a set period of time.

In alternative embodiments of the present invention the indicator may be triggered by a signal transmitted from the identification device.

In a preferred embodiment of the present invention the identification device being near the activation device may be defined as both devices being within one and a half meters of one another.

In a further preferred embodiment where the activation device is worn on the body of the person milking, if the activation device becomes anywhere between one half to one and one half meters distant from the identification device, the indicator may be activated. This feature of the invention insures that the indicator is only triggered when the person milking comes within a restricted proximity range of a cow wearing an identification device For example, if the person milking approached a cow wearing an identification device and proceeded to put milking cups on the cow, the indicator device would be triggered by that person's proximity to the identification device.

It is envisioned in the preferred embodiment that the ranges given translate to the indication device being activated in all instances when the identification device and activation device are within a half meter of each other, and the indication device never being activated when the distance between the activator and identification devices exceeds one and a half meters.

The range variation occurring in the operation of the device is caused by variation at which direction an operator may approach the identification device. Depending on the direction of approach to the identification device the range at which the indicator is triggered may vary, but should be triggered as disclosed in the ranges given above.

In a preferred embodiment of the present invention the proximity at which the activation device needs to be from the identification device is determined by the strength of the signal transmitted by the identification device.

In a preferred embodiment when the identification and activator devices operate via radio frequency transmission, the cow shed environment in which they are used causes major difficulties for the identification system's operation. Firstly, in a preferred embodiment the identification device may be attached to a cows hind leg. The milking shed also includes a number of large metallic tubing stalls, as well as other pieces of mechanical equipment and plant. Finally the milking shed is usually very damp, as the floors of the shed need to be frequently washed to remove cow excrement and urine.

These factors make the operation of a radio frequency signalling device very difficult in this environment. A transmitter or receiver device may experience problems in providing a signalling device which performs consistently and controllably over a standard proximity range.

A preferred embodiment of the present invention involves circuitry associated with the identification and activation devices which is specifically adapted to combat the problems associated with operation in the cow shed environment. The circuits used allow the performance of the identification system to be consistent and controllable over the range of proximity values required to operate the invention effectively.

In a preferred embodiment of the present invention the identification device includes an aerial which allows the transmission of radio frequency signals. The identification device circuitry and associated aerial may be adapted to provide a substantially consistent radio frequency radiation pattern over a 360 degree radius. This regular radiation pattern ensures the performance of the identification system does not vary substantially when the identification device is approached from a number of different directions.

In a preferred embodiment of the present invention the activation device may include a radio frequency receiver circuitry and an associated aerial. The receiver circuitry and aerial may be adapted in the preferred embodiment to be worn on the body of an operator, and configured so that the body of the operator does not substantially interfere with reception of radio frequency signals by the device.

In a preferred embodiment of the present invention all the components of the identification system are self contained and are powered with self contained battery systems.

This allows the system components to be easily waterproofed and sealed inside a sturdy impact resistant plastic casing. In addition no extra power transmission lines are required in a milking shed or extra electrical outlets found for the identification system components.

In a preferred embodiment of the present invention the identification system includes low battery monitoring components.

In a preferred embodiment, the indicating device may transmit a secondary radio transmission if circuitry associated with the device detects a low battery level. This low battery signal is transmitted instead of the normal radio transmission signal, to indicate the proximity of the identification device, and its low battery condition.

Battery level monitoring circuitry may also be included in the activation device to detect the battery level of the activation device.

In a preferred embodiment of the present invention the activation device transmits a secondary triggering signal to the indicator when it receives the low battery signal from the identification device. When the indicator receives this secondary signal from the activation device it sounds an audible alarm siren which differs in tone, pitch, volume or frequency to that normally transmitted when an identification device with normal battery level is detected.

When the battery level monitoring circuitry in the activation device senses a low battery condition, a light emitting diode mounted into the casing of the activation device is caused to flash intermittently, alerting a system operator to the low battery condition of the activation device.

In a preferred embodiment, battery power to an identification device is activated or enabled at the point of sale of the device. This effectively increases the battery life of the device, as power is not consumed when the device is in storage with a retailer. Once the power to an identification device has been activated, the device may also be marked with a date, to give the operator a rough idea of how long the devices battery has been operating for.

In alternative embodiments, the operator may activate the identification device's power supply themselves when the device is required. Again the identification device may be marked with an activation date showing when power was first supplied to the device.

In a preferred embodiment an identification device battery power supply is enabled by a magnet being held over a reed switch incorporated into the device. The magnetic field causes the reed switch to close, triggering the supply of battery power to the device.

The present invention as currently described provides many advantages over the current prior art.

The identification system allows easy identification and isolation of sick animals. In the case of dairy farming the invention ensures that the milk collected is not contaminated with pathogens or bovine medications.

Unlike other forms of identifying sick dairy cows the invention provides an unmistakable and obvious indicator when a selected animal has been identified.

The identification system operates over a specific proximity range only. The alarm signal is only triggered when the activation device comes within a standard proximity range from the identification device. This avoids any confusion as to which cow triggered the alarm signal.

Unlike more sophisticated systems which include complex computerised data logging, the invention is relatively simple and cheaply constructed. There is no need for further power outlets to supply a computerised data logging and processing equipment.

The associated cost of such high technology machines is also avoided.

The invention may be manufactured in large quantities to provide a cheap final product which is accessible to most dairy farmers. Separate components of the system may also be cheaply replaced if they break down, not requiring the entire system to be overhauled or replaced.

The invention's components may also be packaged in self contained waterproof and sturdy plastic housings, which make the system ideal for farming and dairy applications.

There is no need for a farmer using this identification system to outfit every animal in his or her herd with an identification device. An operator of the invention only requires a limited number of identifying components for attachment to a limited number of selected sick animals, not the entire herd.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
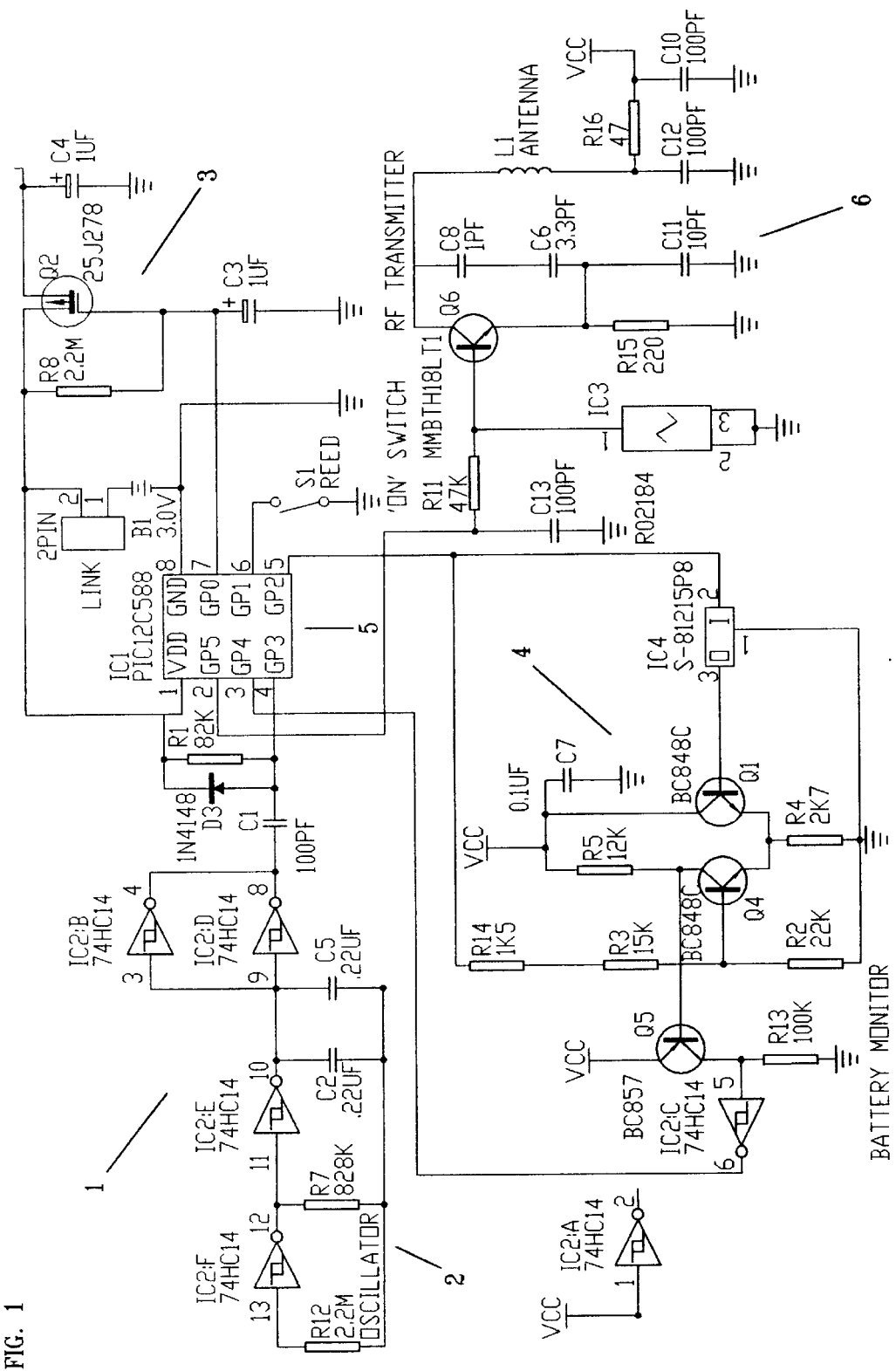
FIG. 1 is a schematic diagram of the electrical components of the identification device in one embodiment.

FIG. 1 illustrates the components of the identification device used in one embodiment of the present invention.

The identification device circuitry 1 consists of several functional components. These components are an oscillator 2, a power switch 3 a battery monitor 4, a micro controller 5 and a radio frequency transmitter 6.

The oscillator circuit 2 includes a Schmitt trigger comparator, IC2 (BDEF) a charging/discharging resistor R7 and two charging/discharging capacitors C2 and C5. This is a free running oscillator designed to operate at one hertz by charging and discharging C2 and C5 at regular intervals to produce a square wave from IC2: B and IC2:D outputs. The oscillation rate, which in this embodiment is approximately one hertz, is controlled by the ratio of R7, C2 and C5.

In operation C2 and C5 are charged up when pin 12 of IC2:F is driven high via resister R7. Once capacitors C2 and C5 are charged to a specific voltage level, R12 a feedback resister triggers the switching of the schmitt triggered comparator on pin 13 of IC2, driving pin 12 low and discharging C2 and C5 through R7. Once capacitors C2 and C5 have discharged to a specific low voltage level, the feed back resistor 12 again triggers the switching of the schmitt triggered comparator, again causing the capacitors C2 and C5 to recharge.

The output of the oscillator 2 is AC coupled to the micro controller 5 via capacitor C1. Capacitor C1 provides a very short pulse to the reset pin of the micro controller on every negative edge of the oscillator square wave.

Diode D3 is also included to protect the micro controller reset pin from an over voltage spike generated from capacitor C1 on the positive edge of the oscillator wave form.

The power switch 3 includes a reed switch S1 and P channel field effect transistor Q2.

Initially, an unused transmitter supplied is not powered for normal operation, with the micro controller 5 remaining in a "sleep mode" until activated. In sleep mode the micro controller shuts down all its internal activities and waits for a special event to wake it up. In this mode its power consumption is extremely low to extend the battery life of the device.

To activate the micro controller 5 from its initial sleep state a magnet must be held over the reed switch S1 for three or more seconds. This magnet then closes the reed switch S1 to automatically wake up the micro controller from sleep mode. If the reed switch S1 remains closed for more than 3 seconds the micro controller 5 will drive its pin 7 low, turning on transistor Q2. This transistor then allows power to be supplied to the remaining transmitter circuitry, permanently turning on power to the transmitter device.

The battery monitor circuit 4 functions as a differential amplifier, with one input being a reference voltage and the other being the supply voltage.

Transistor Q1 is supplied with a reference voltage from IC4, turning on transistor Q1. Transistor Q4 is supplied with the device supply or battery voltage from output GP2 of micro controller 5.

When the supply voltage applied to transistor Q4 is greater than 2.6 volts, transistor Q4 turns on harder than transistor Q1, forcing transistor Q1 to turn off and allowing current to be drawn through resistor R5. The current drawn through resistor R5 then causes the base of transistor Q5 to go low, switching Q5 on and hence the output of the battery monitor 4 will go low through inverter IC2:C.

If the supply voltage is less than 2.6 volts transistor Q4 is unable to turn transistor Q1 off, resulting in transistor Q5 staying off and the battery monitor output from inverter IC2:C being high.

The output from the battery monitor circuit 4 is then applied to pin 3 of the micro controller 5.

As specified above the micro controller 5 is supplied to a consumer in a sleep mode, where power consumption in the device is kept to a minimum. Once activated by the power switch 3 the micro controller 5 turns on power to the remaining circuitry, going into its normal mode of operation, then back into sleep mode to conserve power. The micro processor is then woken up from sleep mode every second by the output of the oscillator 2.

When woken up from sleep mode the micro processor 5 outputs a one millisecond pulse to the RF transmitter 6 and checks the battery voltage. If the battery voltage is sensed as low, the software of the micro controller 5 will change the pattern of output pulses to the RF transmitter 6 such that it will miss every third pulse. Once all of the above tasks are completed the micro processor then puts itself back into sleep mode to conserve battery power.

The RF transmitter 6 includes a surface acoustic wave resonator IC3 and a colpitts oscillator incorporating L1 as the antenna.

The RF transmitter circuit 6 is turned off and on by a voltage applied to the base of transistor Q6 from output GP5 of the micro controller. The micro controller 5 may send short one millisecond pulses to transistor Q6, resulting in the transmitter 6 emitting short one millisecond radio frequency pulses through an antenna L1.

Figure 2:
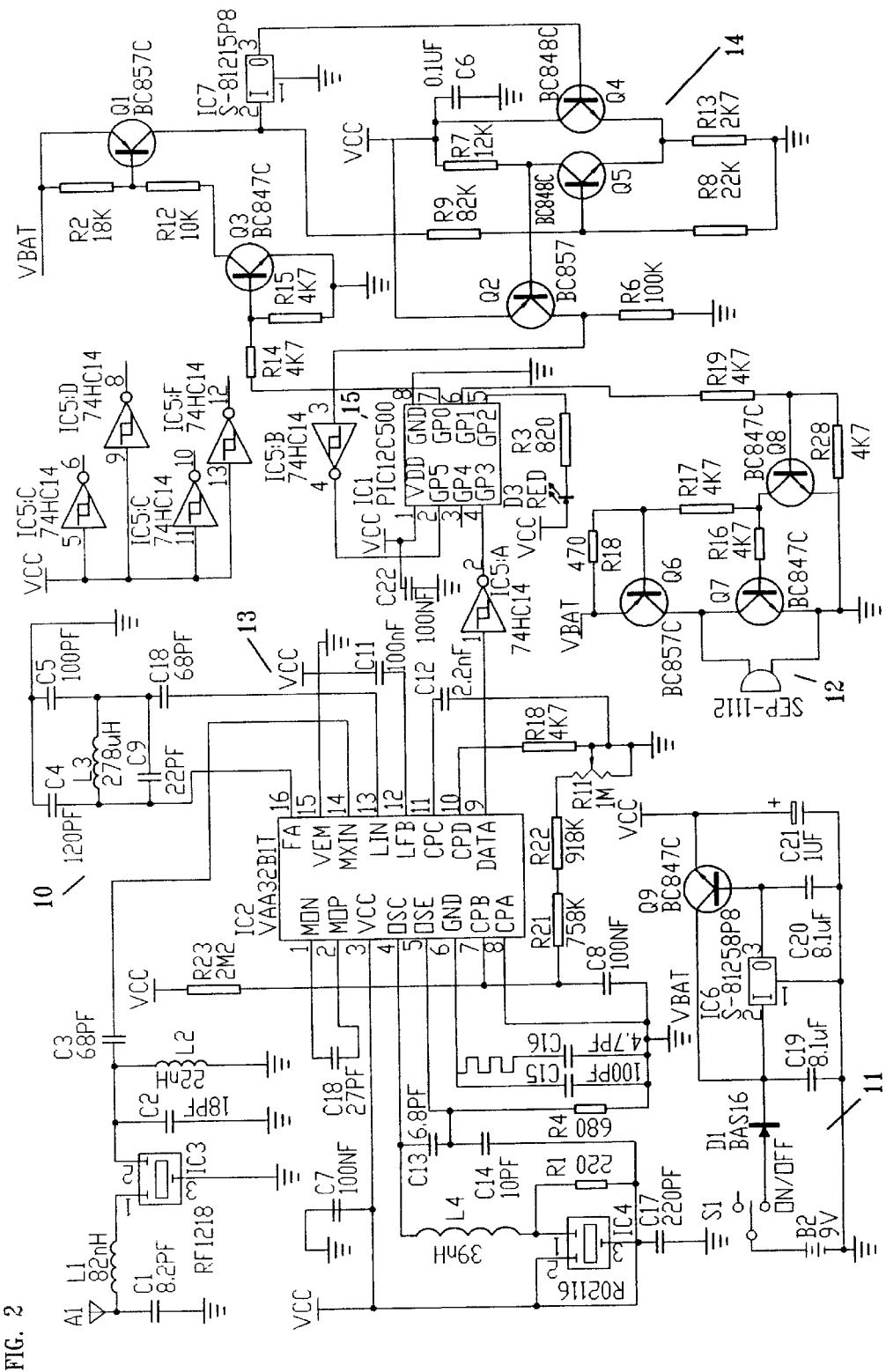
FIG. 2 is a schematic diagram of the electrical components of the activation device and indication device in one embodiment.

FIG. 2 illustrates the electrical components of the activation and indication devices as used in one embodiment of the invention.

The activation and indication devices are illustrated by the receiver circuit 10. The receiver circuit 10 consists of 5 main component circuits. These circuits are a power supply 11, an indicator buzzer circuit 12, a radio frequency receiver 13, a low battery monitor 14 and a micro processor 15.

The power supply circuitry 11 includes a low power five volt regulator, IC6 and a series pass transistor Q9 to regulate the 9 volt battery supply to the electronics. The series pass transistor Q9 is used to improve the transient response of the power supply, as the micro controller 15 switches itself in and out of sleep mode, creating power supply transients when the effective current load is switched on and off. These power supply transients may cause false triggering of the radio frequency receiver if the series pass transistor Q9 was not in place.

The receiver 10 also includes an audible indicator, shown in this embodiment as buzzer circuit 12. The buzzer circuit 12 is powered by a nine volt battery shown in the power supply sub circuit 11.

The buzzer circuit 12 includes a piezoelectric transducer SEP/1112, two driving transistors Q6 and Q7 and a buffering transistor Q8 to protect micro processor 5 from the battery power supply.

In operation, a 4 kilohertz signal is transmitted from the micro processor 15 via output pin 6 to the base of Q8. When the base of Q8 is high transistor 8 turns on, causing transistor Q6 to turn on and transistor Q7 to turn off When transistor Q6 is on the piezo transducer is capacitively charged.

When transistor Q8 is turned off, transistor Q6 is turned off and transistor Q7 is turned on, allowing the capacitive charge on piezo transducer SEP/112 to discharge through transistor Q7. Transistor Q8 is driven with a four kilohertz frequency signal, which is the resonant frequency of the piezo transducer. The charging and discharging of the piezo transducer at its resonant frequency makes it vibrate and emit the required buzzing sound.

The battery monitor 14 is substantially the same as that used in the transmitter disclosed in FIG. 1. However, to conserve power the battery monitor is turned on only at selected intervals via the micro processor output pin 7. A signal from pin 7 will turn on transistor Q1, allowing the battery voltage to be supplied to the battery monitor circuit for a short period of time. Transistors Q1 and Q3 also act as high voltage switches to isolate the micro controller 15 from the unregulated battery voltage.

The operation of the battery monitor is substantially similar to that disclosed in the battery monitor used in the transmitter. However, due to the higher 9 volt battery voltage used in the receiver circuit different values of resistance are employed in the receiver battery monitor 3. Again when the battery voltage is high (ie. above 7 volts) IC5:B will supply a low signal to micro processor input in to (GP5). When the battery voltage is low (below 7 volts) IC 5:B will supply a high signal to micro processor pin 2.

The receiver 10 also includes a radio frequency receiver 13 to intercept radio frequency signals transmitted by the transmitter of FIG. 1.

The RF receiver circuit 13 uses a fully integrated single chip receiver, UAA3201T, IC2. IC2 is primarily intended for use in VHF or UHF systems employing direct return to zero amplitude shift keying modulation and uses a surface acoustic wave (SAW) oscillator and filter, (IC3 and IC4). These devices provide the RF receiver with excellent temperature stability, select the desired transmitter frequency and reduce the reception of unwanted noise.

The output of the integrated receiver chip IC2 is taken from its pin 9 and feed into an inverting buffer, IC5:A. The output of this inverting buffer is then feed into pin 4 of the micro controller 5.

The range control of the RF receiver 13 is controlled by components R21–R23, C8, R10 and R11. R11 is used to manually adjust the range of the RF receiver 5 between maximum and minimum pre set ranges. The range control components stop the receiver chip IC2 from outputting a signal to the micro controller until a certain input power level has been received. This input power level is directly proportional to the distance from the transmitter.

Further details of the RF receiver chip, UAA3201T (IC2) are given in Phillip's semi conductor application note AN95036.

The micro controller 15 normally places itself in sleep mode as is the case with the micro controller described in FIG. 1. When in sleep mode the micro controller 15 reduces the amount of current drawn by the receiver circuit 10 and hence increases the life of the device's battery power supply.

The micro controller 15 may be woken up from sleep mode by either its watchdog timer or upon receipt of the appropriate signal from the RF receiver 13.

The micro controllers watchdog timer operates at two second intervals. Every two seconds the timer wakes up the micro controller which then checks the state of the battery via battery monitor 14. If the battery monitor 14 shows that the battery supply voltage is high the micro controller causes battery LED D3 to flash briefly. If the battery voltage level detected is low the micro controller causes battery diode D3 to flash intermittently, on for 2 seconds then off for 2 seconds to indicate a low battery condition.

The micro controller 15 will also wake up from sleep mode if an RF pulse is detected by the RF receiver 13 which then signals to the micro controller via buffer IC5:A. On receipt of a signal from the RF receiver 13 the micro controller 15 then activates the buzzer circuit 11 via output pin 6 of the micro controller 15. If a signal from the RF receiver 13 is not detected after 2.5 seconds, the micro controller 15 will then go back into sleep mode.

When active and receiving signals from the RF receiver 13 the micro controller 15 measures the time between each of the incoming pulses and compares the previous period of the signal with the present period. If these two times are the same, then the transmitter battery is in good condition and the micro controller software outputs a continuous beeping tone through the buzzer circuit 11. If one of the pulse times is twice as long as the other then the transmitters battery supply is low and the micro controller software will output a fast alternating beep tone to indicate that the transmitter battery supply is low.

Figure 3:
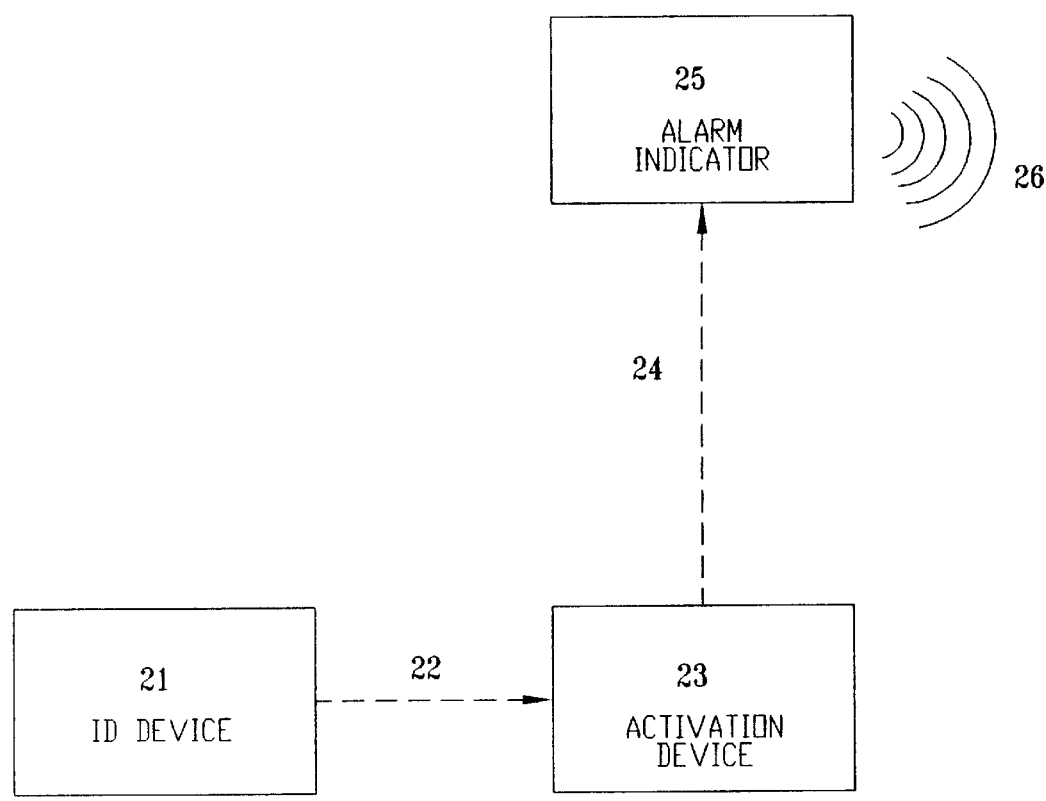
FIG. 3 is a schematic diagram of the signal transmissions made in accordance with one embodiment of the invention's method of operation.

FIG. 3 illustrates a communication schedule in accordance with the method of operation of the invention.

Identification device 21 continually emits a radio signal 22.

Activation device 23 is sensitive to the radio signal 22 emitted by the identification device 21. On receipt of radio signal 22 activation device 23 transmits an electrical activation signal 24 to the alarm indicator 25.

On receipt of the electrical activation signal 24 from the activation device 23, the alarm indicator 25 transmits an audible siren 26 to alert a farmer to the proximity of an animal to be identified.

Aspects of the present invention have been described by way of example only and it should be appreciated that modifications and additions may be made thereto without departing from the scope thereof.

What we claim is:

1. A method of identifying a livestock animal within a group, characterised by the steps of:
   a) attaching an identification device to a livestock animal within the group, and
   b) locating an activation device at a location, and
   c) activating an alarm indicator when the identification device is near and within a range of the activation device, wherein activation of an alarm indicator will alert a person near the location.

2. A method of identifying an animal as claimed in claim 1, wherein the animal is a dairy cow.

3. A method of identifying an animal as claimed in claim 1, wherein the activation of the indicator causes the indicator to emit an audible signal.

4. A method of identifying an animal as claimed in claim 1, wherein the activation device and alarm indicator are located within the same housing.

5. A method of identifying an animal as claimed in claim 1, wherein the identification device continually emits an identification signal once the identification device has been activated.

6. A method of identifying an animal as claimed in claim 1, wherein the identification device is attached to the leg of an animal to be identified.

7. A method of identifying an animal as claimed in claim 1, wherein the identification device includes a radio frequency transmitter.

8. A method of identifying an animal as in claim 7, wherein the identification device includes an aerial, wherein the aerial provides a substantially regular radiation pattern over a 360° radius.

9. A method of identifying an animal as claimed in claim 8, wherein the identification device includes a self contained power supply.

10. A method of identifying an animal as claimed in claim 9, wherein the identification device is housed within a waterproof container.

11. A method of identifying an animal as claimed in claim 9 or 10 wherein the identification device is capable of transmitting a signal which indicates a low energy level of the self contained power supply.

12. A method of identifying an animal as claimed in claim 11, wherein the identification device is capable of transmitting only one type of identification signal, and only one type of low energy supply signal.

13. A method of identifying an animal as claimed in claim 10, wherein the identification device includes energy supply monitoring components.

14. A method of identifying an animal as claimed in claim 1, wherein the activation device is housed within a waterproof container.

15. A method of identifying an animal as claimed in claim 1, wherein the activation device includes a self contained power supply.

16. A method of identifying an animal as claimed in claim 15, wherein the activation device includes power supply monitoring components.

17. A method of identifying an animal as claimed in claim 1, wherein the activation device is located on the body of the identification system's operator.

18. A method of identifying an animal as claimed in claim 1, wherein location of the activation device on the body of an operator is via forming the activation device into a necklace.

19. A method of identifying an animal as claimed in claim 1, wherein the activation device includes a radio frequency receiver.

20. A method of identifying an animal as claimed in claim 1, wherein the indicator will always be activated when the identification device is within 0.5 meters of the activation device.

21. A method of identifying an animal as claimed in claim 20, wherein the indicator will not be activated when the identification device is more than 1.5 meters distant from the activation device.

22. An identification system, for identifying a livestock animal within a group, wherein the identification system includes, an identification device attached to an animal, an activation device, and an alarm indicator, characterised in that the location of the activation device near and within a range of the identification device activates the alarm indicator, and the activated alarm indicator can alert a person near the location of the activation device.

23. An identification system as claimed in claim 22, wherein the farm animal is a dairy cow.

24. An identification system as claimed in claim 22, wherein the activation of the indicator causes the indicator to emit an audible noise.

25. An identification system as claimed in claim 22, wherein the activator and indicator are located within the same housing.

26. An identification system as claimed in claim 22, wherein the identification device continually emits an identification signal once the identification device has been activated.

27. An identification system as claimed in claim 22, wherein the identification device includes a radio frequency transmitter.

28. An identification system as claimed in claim 22, wherein the identification device is attached to the leg of an animal to be identified.

29. An identification system as claimed in claim 22, wherein the identification device includes a radio frequency transmitter and aerial, wherein the aerial provides a substantially regular radiation pattern over a 360° radius.

30. An identification system as claimed in claim 29, wherein the identification device includes a self contained power supply.

31. An identification system as claimed in claim 30, wherein the identification device is housed within a waterproof container.

32. An identification system as claimed in claim 30, wherein the identification device is capable of transmitting a signal which indicates a low energy level of the self contained power supply.

33. An identification system as claimed in claim 32, wherein the identification device is capable of transmitting only one type of identification signal, and only one type of low energy supply signal.

34. An identification system as claimed in claim 33 wherein the identification device includes energy supply monitoring components.

35. An identification system as claimed in claim 34, wherein the activation device is housed within a waterproof container.

36. An identification system as claimed in claim 22, wherein the activation device includes a self contained power supply.

37. An identification system as claimed in claim 36, wherein the activation device includes power supply monitoring components.

38. An identification system as claimed in claim 37, wherein the activation device is located on the body of the identification system's operator.

39. An identification system as claimed in claim 38, wherein location of the activation device on the body of an operator is via forming the activation device into a necklace.

40. An identification system as claimed in claim 22, wherein the activation device includes a radio frequency receiver.

41. An identification system as claimed in claim 40, wherein the indicator will always be activated when the identification device is within 0.5 meters of the activation device.

42. An identification system as claimed in claim 41, wherein the indicator will not be activated when the identification device is more than 1.5 meters distant from the activation device.

* * * * *